(12) United States Patent
Semrow et al.

(10) Patent No.: US 12,123,448 B2
(45) Date of Patent: Oct. 22, 2024

(54) THREADED SCREW FASTENER

(71) Applicant: Illinois Tool Works Inc., Glenview, IL (US)

(72) Inventors: Thomas M. Semrow, Waukesha, WI (US); Kenneth Roger LeVey, II, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 211 days.

(21) Appl. No.: 17/852,535

(22) Filed: Jun. 29, 2022

(65) Prior Publication Data

US 2023/0003246 A1 Jan. 5, 2023

Related U.S. Application Data (63) Continuation-in-part of application No. 29/797,377, filed on Jun. 30, 2021, now Pat. No. Des. 1,013,497.

(60) Provisional application No. 63/216,731, filed on Jun. 30, 2021.

(51) Int. Cl.
   *F16B 23/00* (2006.01)
   *F16B 35/00* (2006.01)

(52) U.S. Cl.
   CPC .......... *F16B 23/0061* (2013.01); *F16B 35/00* (2013.01); *F16B 23/00* (2013.01)

(58) Field of Classification Search
   CPC .... F16B 21/086; F16B 23/00; F16B 23/0023; F16B 23/0061; F16B 25/0021; F16B 25/0031; F16B 35/00; F16B 35/06
   USPC ................. 411/378, 386, 402–404, 500, 510
   See application file for complete search history.

(56) References Cited

U.S. PATENT DOCUMENTS

| | | | |
|---|---|---|---|
| 1,857,388 | A | 5/1932 | Linderman |
| 2,016,610 | A | 10/1935 | Moeller |
| 3,540,509 | A | 11/1970 | Gutshall |
| 3,640,326 | A | 2/1972 | Brown |
| 3,926,237 | A | 12/1975 | Enders |
| 4,310,272 | A | 1/1982 | Rich |
| 4,627,776 | A | 12/1986 | Pamer |
| 4,808,050 | A | 2/1989 | Landt |
| 4,812,095 | A | 3/1989 | Piacenti |

(Continued)

FOREIGN PATENT DOCUMENTS

| | | |
|---|---|---|
| CN | 304193877 | 7/2017 |
| GB | D2041889 | 9/1980 |

(Continued)

OTHER PUBLICATIONS

Crimptite® Fasteners, © 2015 Stanley Black & Decker, Inc., Rev. May 2015, www.StanleyEngineeredFastening.com, Stanley Engineered Fastening.

(Continued)

*Primary Examiner* — Roberta S DeLisle
(74) *Attorney, Agent, or Firm* — McAndrews, Held & Malloy, Ltd.

(57) ABSTRACT

Disclosed is a sheet-metal fastener configured to join two components, such as sheet-metal. The sheet-metal fastener comprising a head and a shank. The head may define an undercut region and a serrated region. The serrated region can be positioned at an outer perimeter of the head. The serrated region can be composed of a plurality of knurls. The shank extends perpendicularly from the undercut region and comprises one or more threads.

20 Claims, 7 Drawing Sheets

(56) References Cited

U.S. PATENT DOCUMENTS

| | | | |
|---|---|---|---|
| 4,820,235 A | 4/1989 | Weber | |
| 4,842,463 A | 6/1989 | Landt | |
| 5,234,301 A * | 8/1993 | Grossberndt | F16B 25/0021 |
| | | | 411/386 |
| 5,244,326 A | 9/1993 | Henriksen | |
| 5,356,253 A * | 10/1994 | Whitesell | F16B 39/282 |
| | | | 411/188 |
| 5,361,478 A | 11/1994 | Grossberndt | |
| 5,746,560 A * | 5/1998 | Barth | F16B 35/065 |
| | | | 411/959 |
| D437,211 S | 2/2001 | Pamer | |
| 6,206,737 B1 | 3/2001 | Bonilla | |
| D448,659 S | 10/2001 | Pamer | |
| 7,014,386 B1 | 3/2006 | Mullet | |
| D557,132 S | 12/2007 | Shinjo | |
| 7,597,516 B2 | 10/2009 | Bucciferro | |
| D604,600 S | 11/2009 | Lesesky | |
| 8,142,125 B2 | 3/2012 | Vrana | |
| 8,342,788 B2 * | 1/2013 | Matthiesen | F16B 25/0047 |
| | | | 411/386 |
| 8,348,575 B2 | 1/2013 | Walther | |
| 9,175,715 B2 | 11/2015 | Babej | |
| 9,644,668 B2 * | 5/2017 | Taylor | F16B 35/06 |
| 9,695,860 B2 | 7/2017 | Pieciak, Jr. | |
| 9,856,901 B2 | 1/2018 | Dill | |
| D871,201 S | 12/2019 | Shinjo | |
| 10,570,943 B2 | 2/2020 | Gong | |
| 11,209,040 B2 | 12/2021 | O'Donnell | |
| 2007/0231105 A1 | 10/2007 | Parker | |
| 2009/0136319 A1 | 5/2009 | Panasik | |
| 2011/0289752 A1 * | 12/2011 | Werthwein | F16B 25/106 |
| | | | 411/386 |
| 2012/0107070 A1 * | 5/2012 | Bongartz | F16B 25/106 |
| | | | 411/378 |
| 2012/0251264 A1 * | 10/2012 | Taylor | F16B 25/0021 |
| | | | 411/394 |
| 2012/0266560 A1 * | 10/2012 | Panasik | F16B 35/065 |
| | | | 411/387.4 |
| 2013/0149067 A1 | 6/2013 | Shinjo | |
| 2013/0302107 A1 | 11/2013 | Burton | |
| 2014/0044500 A1 * | 2/2014 | Pieciak, Jr. | F16B 25/0073 |
| | | | 411/403 |
| 2022/0049737 A1 | 2/2022 | Oh | |

FOREIGN PATENT DOCUMENTS

| | | |
|---|---|---|
| GB | 2041889 | 1/1995 |
| JP | D1274257 | 6/2006 |
| JP | D1537070 | 11/2015 |
| JP | D1549001 | 5/2016 |
| JP | D1585111 | 9/2017 |
| JP | D1728679 | 10/2022 |

OTHER PUBLICATIONS

Fastening Solutions, Acument® Global Technologies, © 2011-2014 Acument Intellectual Properties, LLC.

* cited by examiner

THREADED SCREW FASTENER

CROSS-REFERENCE

The present application claims the benefit under 35 U.S.C. § 119(e) to both U.S. Provisional Patent Application Ser. No. 63/216,731, filed Jun. 30, 2021, and entitled "Threaded Screw Fastener," and U.S. Design patent application Ser. No. 29/797,377, filed Jun. 30, 2021, and entitled "Fastener," the contents of each of which are hereby incorporated by reference.

FIELD

The present disclosure generally relates to a threaded screw fastener, and more particularly to a sheet-metal fastener.

BACKGROUND

A sheet-metal fastener is used for attaching and tightening metal objects to one another. A sheet-metal fastener typically features a threaded shank along—with a head, which may be flat, rounded, or another suitable shape.

SUMMARY

The present disclosure relates generally to a threaded screw fastener, and more particularly to a sheet-metal fastener, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIGS. 1b through 1e illustrate, respectively, side, top, bottom, and rear perspective views of the example sheet-metal fastener of FIG. 1a.

FIGS. 3b through 3e illustrate, respectively, side, top, bottom, and rear perspective views of the example sheet-metal fastener of FIG. 3a.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

A threaded screw fastener can be used to join two or more components. An example threaded screw fastener includes a sheet-metal fastener. Sheet-metal fasteners are typically used to fasten one metal object (e.g., sheet metal) with another metal object, although sheet-metal fasteners can be also be used to attach metal object with a wooden, plastic, or any other kind of surface. Sheet-metal fastener are usually represented by a series of 3 unique numbers, which specify the diameter, length, and thread count of the sheet-metal fastener. By way of illustrated, a fastener listed as #10-16×1" specifies that the sheet-metal fastener's diameter is of 10 and is 1 inch long and that it consists of 16 threads; though other diameters and thread counts are contemplated.

In some examples, a sheet-metal fastener configured to join two components (e.g., sheet-metal) comprises a head defining an undercut region and a shank extending from the undercut region. The head comprises a serrated region at an outer perimeter of the head, while the shank comprises threads. The serrated region may comprise a plurality of knurls. The head may further comprise a flange portion, the serrated region being formed on an underside of the flange portion. In some examples, the sheet-metal fastener is a self-tapping fastener. For example, the shank may include a notched tip. In some examples, the shank includes threads of different dimensions positioned along a length of the shank. In some examples, the head comprises one or engagement features to enable an operator to drive the sheet-metal fastener. The head may be a hex washer head. In some examples, each of the plurality of knurls comprises a curvature (C) that is about 0.025 Rad. In some examples, the plurality of knurls are formed via a cold-forming process. In some examples, each of the plurality of knurls defines a back wall that is angled with an underside surface of the flange portion at an angle that is greater than 90 degrees (e.g., about 100 degrees). In some examples, each of the plurality of knurls defines a back wall that is angled with an underside surface of the flange portion at an angle that is 90 degrees. In some examples, when driven about the axis of rotation, each of the plurality of knurls are configured to pull material from a first one of the components beyond an opening formed in a second one of the component and into the undercut region.

Figure 1A:
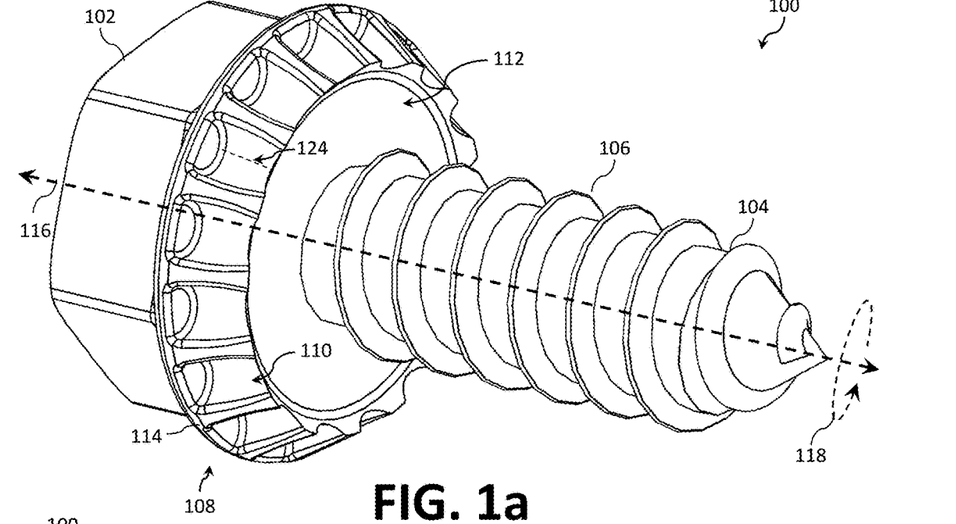
FIG. 1a is a front perspective view of an example sheet-metal fastener in accordance with an aspect of this disclosure.

FIG. 1a is a front perspective view of an example sheet-metal fastener 100 in accordance with an aspect of this disclosure, while FIGS. 1b through 1e illustrate, respectively, side, top, bottom, and rear perspective views of the example sheet-metal fastener 100. As illustrated, the sheet-metal fastener 100 generally comprises a head 102 and a shank 104, wherein the shank 104 includes threads 106 and a tip 120 (e.g., a sharp point or tip). While the sheet-metal fastener 100 is illustrated with a tip 120 that is pointed, the sheet-metal fastener 100 may be configured with a thread-cutting or self-tapping fastener that features a notched tip, which can cut into a metallic surface without pre-drilling.

The sheet-metal fastener 100 may be fabricated using a cold forging technique, though other techniques are contemplated. In some examples, the head 102 is progressively formed by forcing a piece of metal into various dies at high pressure, after which the threads 106 are formed on the shank 104 by a rolling or cutting process. The sheet-metal fastener 100 may be fabricated from one or more materials, including, for example, steel (including stainless steel and steel alloy), brass, bronze, etc. The threads 106 may be distributed evenly along the entire length of the shank 104, or a just a portion thereof. In some examples, the shank 104 may include threads 106 of different dimensions along the length (e.g., a different thread count per inch).

A sharp point or tip aids in cutting into the metal surface. In operation, the shank 104 is rotated about its axis of rotation 116 in rotational direction 118 via a rotational force imparted at the head 102. The head 102 may be a flat head, oval head, truss head, pan head, hex head, or hex washer head (as illustrated). In some examples, the head 102 may be shaped to include one or engagement features to enable an operator to drive the sheet-metal fastener 100 using a power tool (e.g., an electric drill or driver) or manual tool (e.g., a screw driver, socket set, etc.).

As illustrated, the head 102 itself may be shaped to define the engagement feature. For example, the outer perimeter of the head 102 may be a hexagonal shape with a circular flange portion 114 as illustrated, though other head shapes are contemplated, such as round, oval, square, etc. Additionally or alternatively, the head 102 may include one or more recesses 122 that are configured to receive a driver or driving bit. The one or more recesses 122 may be Phillips-style (as illustrated in FIG. 1c), flat slots, square, star, or the like.

Figure 1B:
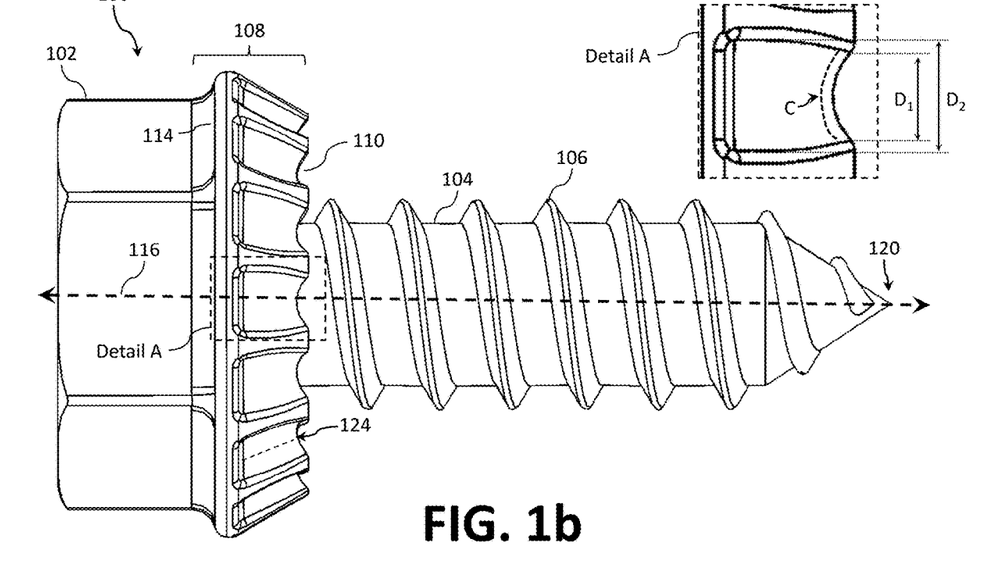
Figure 1C:
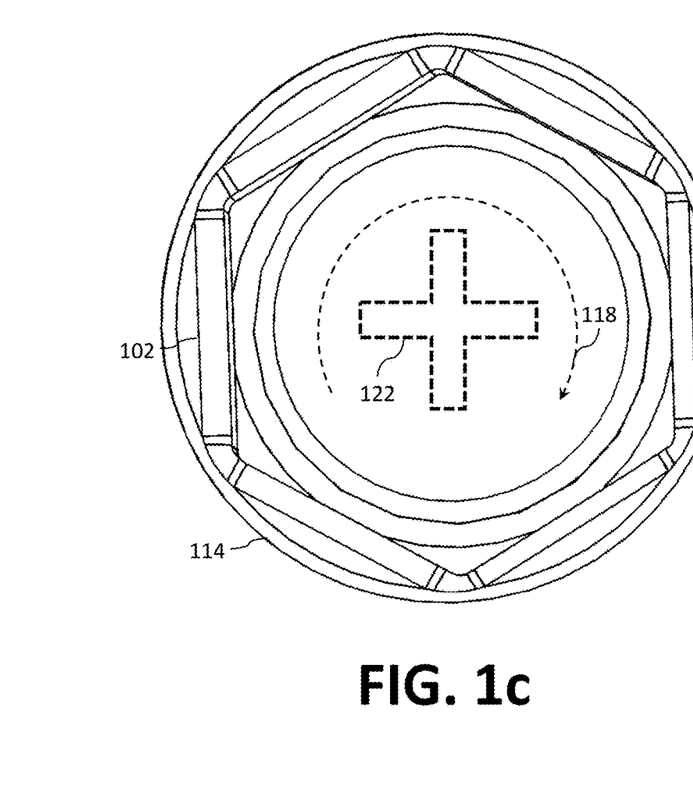
Figure 1D:
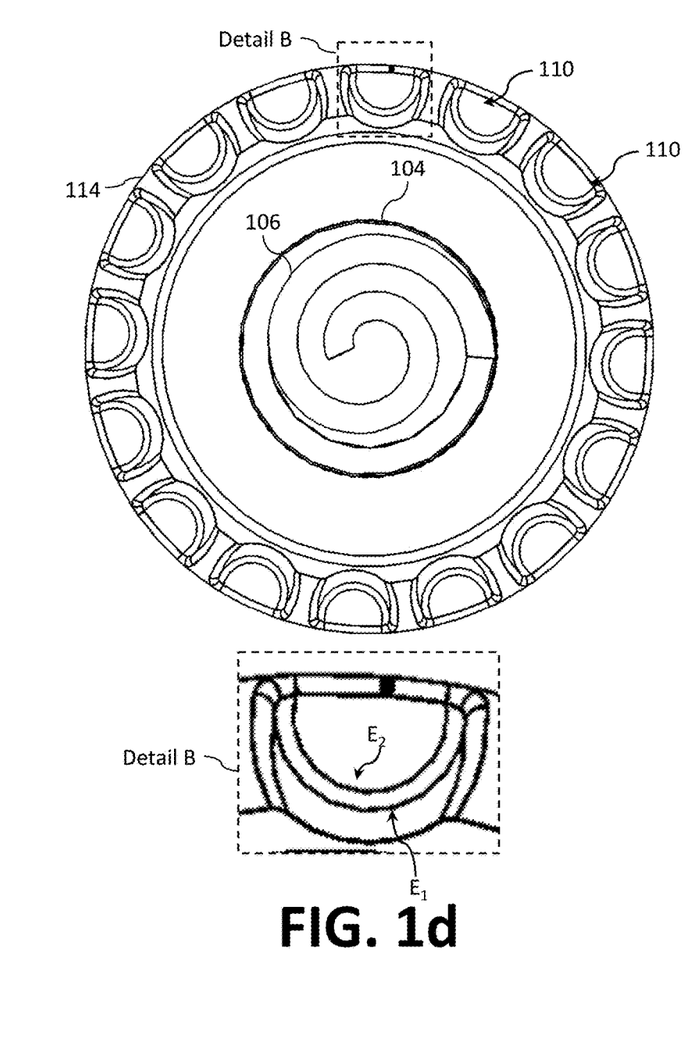
Figure 1E:
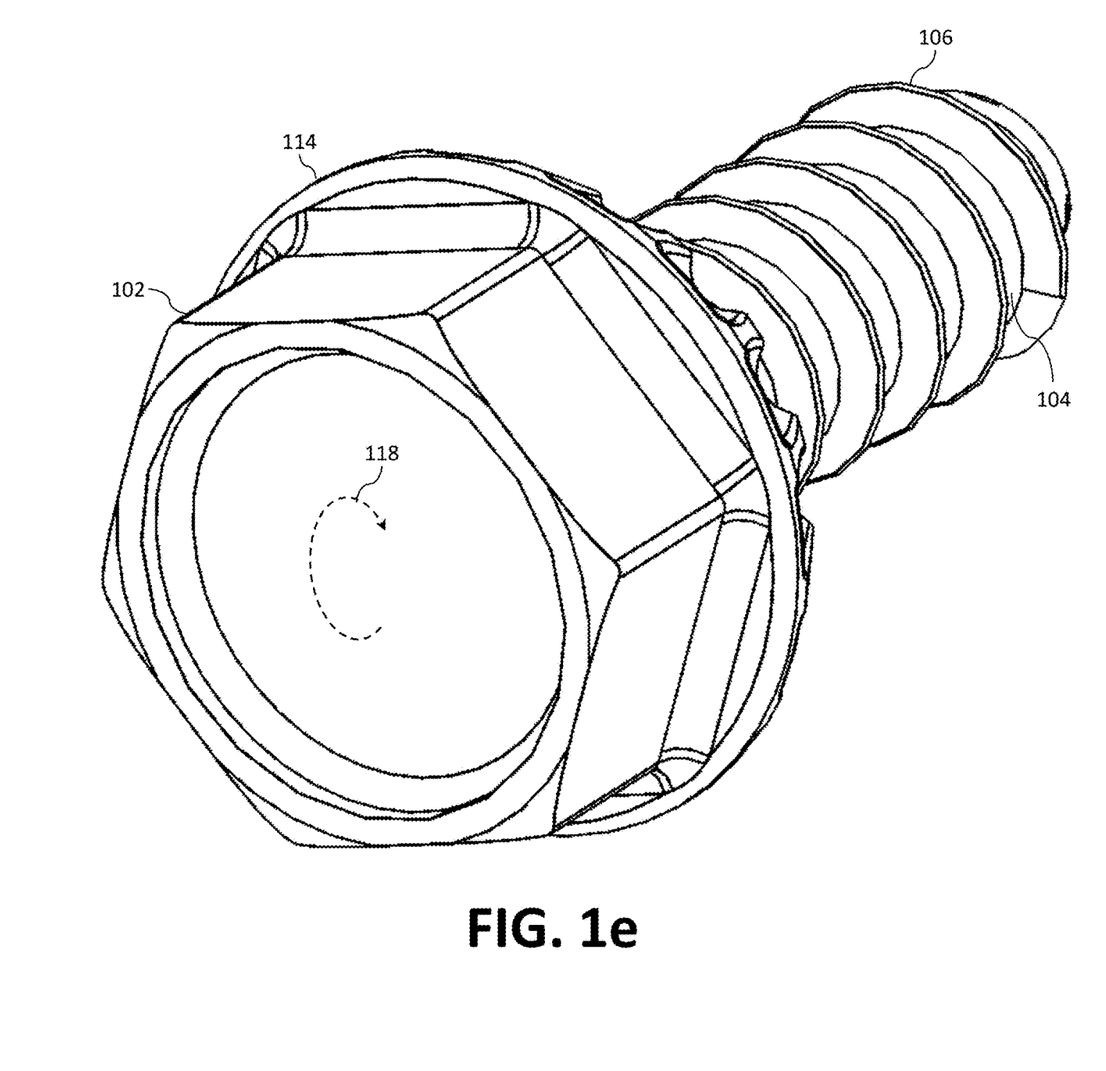

With reference to Detail A of FIG. 1b, the knurls 110 may have a curvature (C) that is 0.025 Rad, whereas the first distance ($D_1$) may be 0.04 inches and the second distance ($D_2$) may be 0.05 inches. One of skill in the art would appreciate that these dimensions are approximated and can deviate based on natural flow of cold formed material in knurling process. Further, the dimensions of the knurls 110 are based on 12 TPI knurling criteria; however, the dimensions will change based on the count of knurls 110 (e.g., a 24 TPI would half most dimensions). With reference to Detail B of FIG. 1d, the first and second edges ($E_1$) and ($E_2$) will follow a break edge of the knurl tool of 0.005 inches in that radial corner from the curvature (C) dimension of FIG. 1b.

The head 102 may further comprise an undercut region 112 on the underside of the head 102. The undercut region 112 may be positioned on the surface of the head 102 that is opposite the one or more recesses 122. As illustrated, the shank 104 extends perpendicularly away from the undercut region 112. The undercut region 112 enables the sheet-metal fastener 100 to maximize engagement between the threads 106 and the material to be fastened. The head 102 includes a serrated region 108, which is composed of a plurality of knurls 110. The sheet-metal fastener 100 is manufactured with the serrated region 108 along the exterior perimeter of the flange portion 114. In one example, the serrated region 108 may be formed on the flange portion 114; however, as illustrated in FIGS. 3a to 3e, the flange portion 114 may be omitted whereby the serrated region 108 is formed elsewhere on the head 102.

Figure 2:
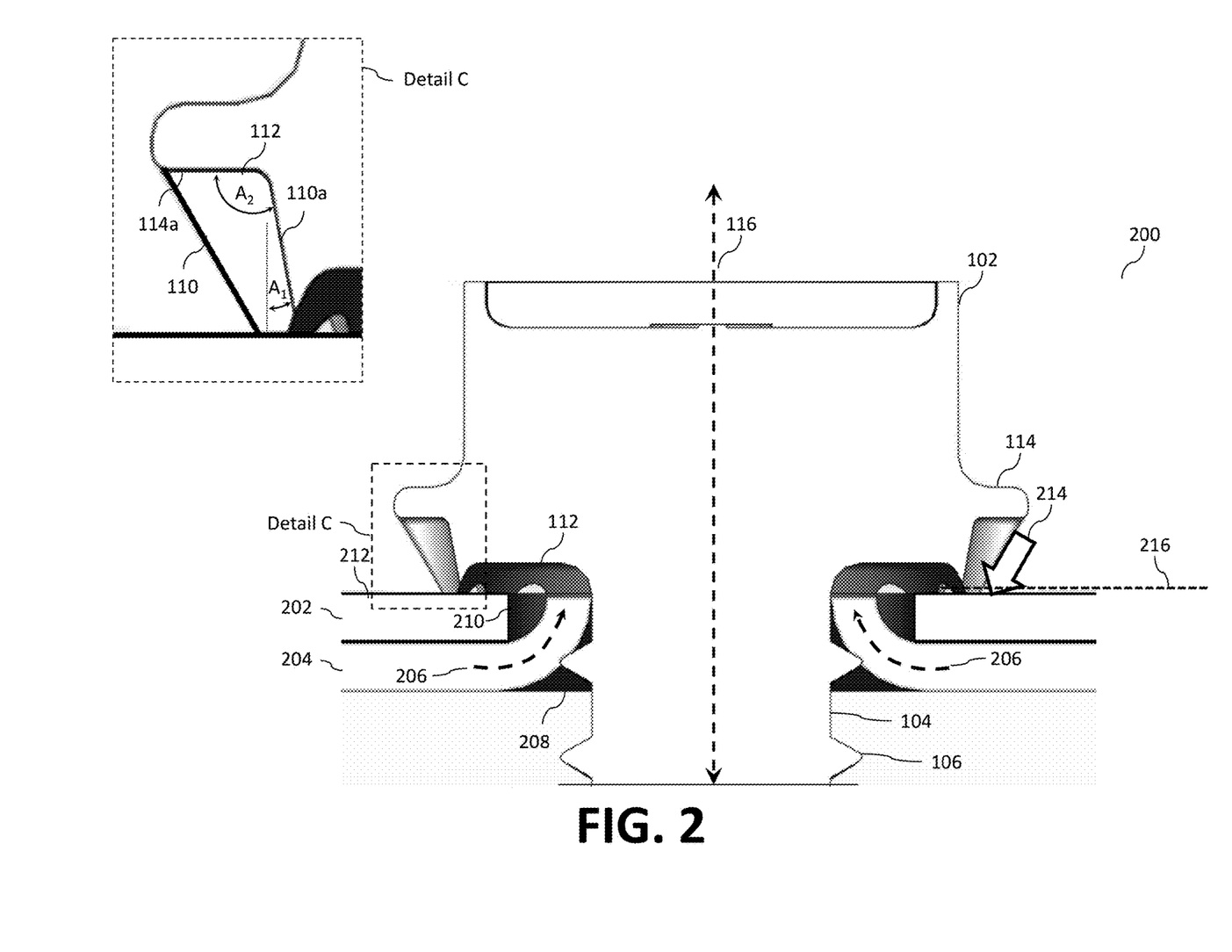
FIG. 2 is a diagram illustrating two pieces of sheet metal joined via the sheet-metal fastener.

FIG. 2 illustrates two pieces of sheet metal (e.g., a first sheet 202 and a second sheet 204) joined via the sheet-metal fastener 100 to form a joint 200. As illustrated, the first sheet 202 (e.g., a top panel) defines a first opening 210 and the second sheet 204 (e.g., a lower panel) defines a second opening 208. In some examples, the diameter of the second opening 208 is less than the diameter of the second opening 208. In operation, the first and second openings 208, 210 are arranged coaxially relative to one another to define a tapped hole or pass through. During assembly, the tip 120 of the sheet-metal fastener 100 is inserted through the tapped hole set. In some examples, the first and second openings 208, 210 are pre-drilled into the material; however, in other examples, the first and/or second openings 208, 210 may be formed by the sheet-metal fastener 100 when driven into the material. For example, in the case of a sheet-metal fastener 100 with a self-tapping tip 120. In the illustrated example, the shank 104 of the sheet-metal fastener 100 can be entirely threaded along its entire length. The tip 120 and the threads 106 are sharp, thereby enabling the sheet-metal fastener to easily cut or pierce through the hard metal surface or other type of surface.

With reference to Detail C of FIG. 2, the lower end of the back wall 110a of the knurl 110 may be tapered inward (toward the axis of rotation 116). For example, the first angle ($A_1$) between the back wall 110a of the knurl 110 and vertical axis (e.g., that is parallel to the axis of rotation 116) may be about 10 degrees (+/−5 degrees), while the second angle ($A_2$) between the back wall 110a and the underside surface 114a of the flange portion 114 may be the first angle ($A_1$) plus 90 degrees. Therefore, each of the plurality of knurls 110 can defines a second angle ($A_2$) with the underside surface of the flange portion 114 that is greater than 90 degrees, in the illustrated example, about 100 degrees.

As the sheet-metal fastener 100 is driven about the axis of rotation 116 in the rotational direction 118 through the first and second openings 208, 210, the threads 106 engage the second sheet 204 at the perimeter of the second opening 208. Torqueing the sheet-metal fastener 100 causes the threads 106 to engage the perimeter of the second opening 208 and bend material upward through the first opening 210 and into the undercut region 112, as indicated by arrow 206. Therefore, when driven about the axis of rotation 116, the plurality of knurls 110 are configured to pull material from one of the components (e.g., second sheet 204) beyond the first opening 210 formed in the other one of the components (e.g., first sheet 202) and into the undercut region 112.

The knurls 110 of the serrated region 108 act as a torque reducer or torque break, against the top plane 212 of the first sheet 202 (or other component). These knurls 110 create a force in the direction indicated by arrow 214, while also acting as a reference plane 216 to which the second sheet 204 will pull past due to the knurls 110 being below the bottom of the flange portion 114 of the sheet-metal fastener 100, and the helix of the threads 106 manufactured above the plane of the knurls 110.

Placing the serrated region 108 at the outer perimeter of the head 102 increases the torque required to cause failure between the threads 106 and the tapped hole. Existing fasteners do not pull in material with the threads 106 beyond the reference plane 216 of the flange portion 114. Pulling the material with the threads 106 beyond the reference plane 216 of the flange portion 114 increases the overall effectiveness of the threaded portion of the joint 200 by fully forming threads in this area. Thus, placing the serrated region 108 at the outer perimeter of the head 102 not only increases the thread 106 engagement to the mating part, but also gives a higher torque to strip window for a more effective threaded joint 200. Another advantage of the disclosed sheet-metal fastener 100 is that it is field reusable. In other words, the sheet-metal fastener 100 can be torqued down repeatedly without continuous degradation to the joint 200.

Figure 3A:
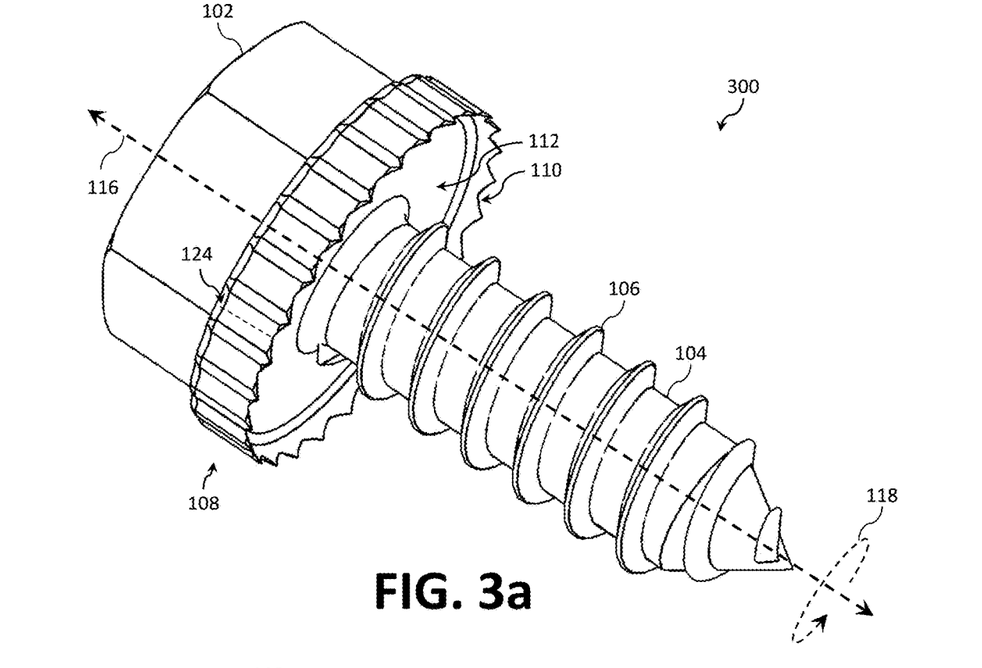
FIG. 3a is a front perspective view of an example sheet-metal fastener in accordance with another aspect of this disclosure.
Figure 3B:
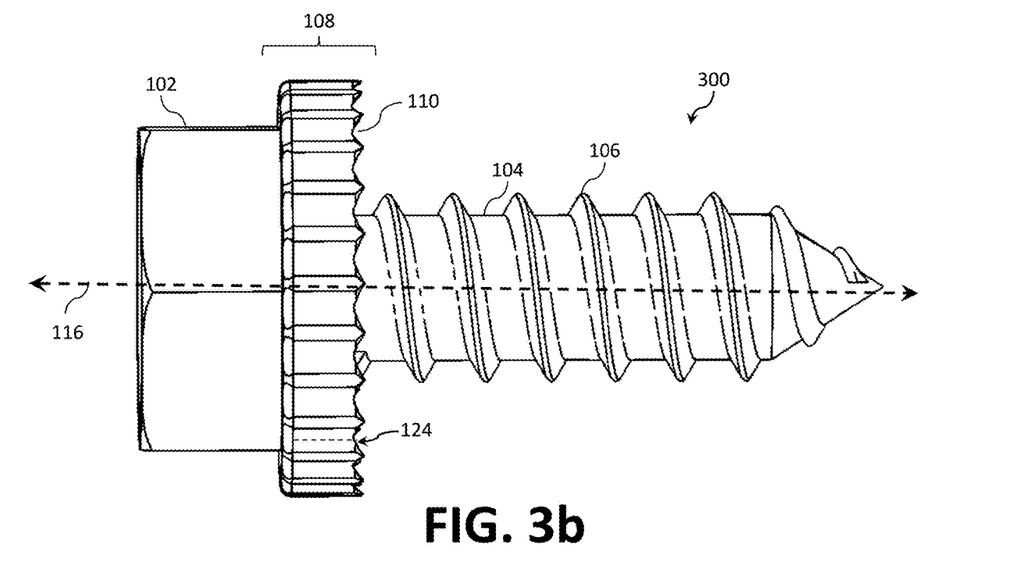
Figure 3C:
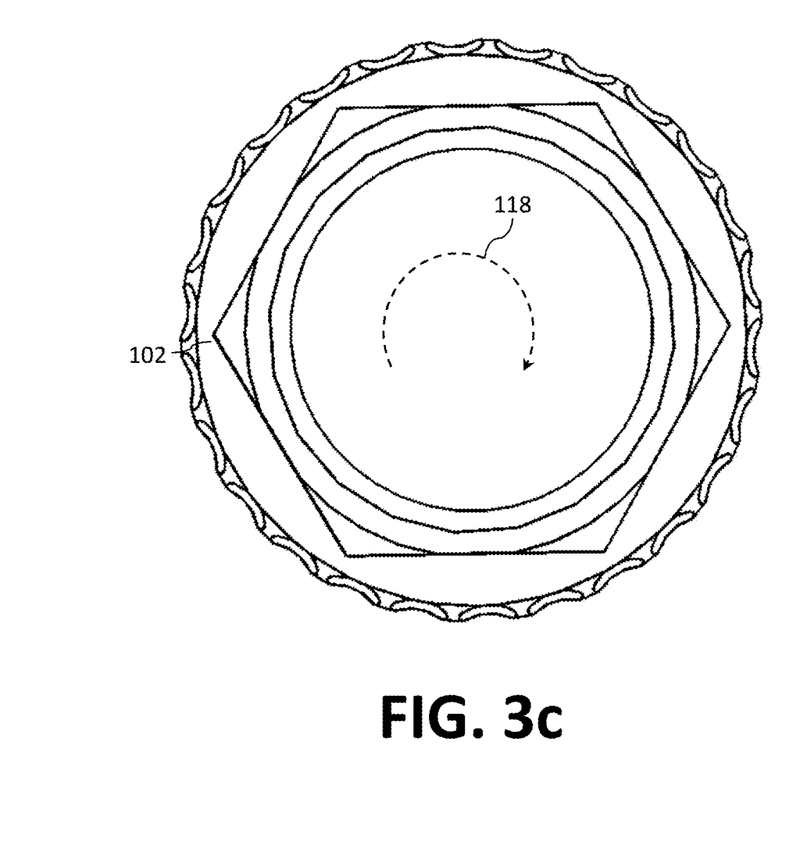
Figure 3D:
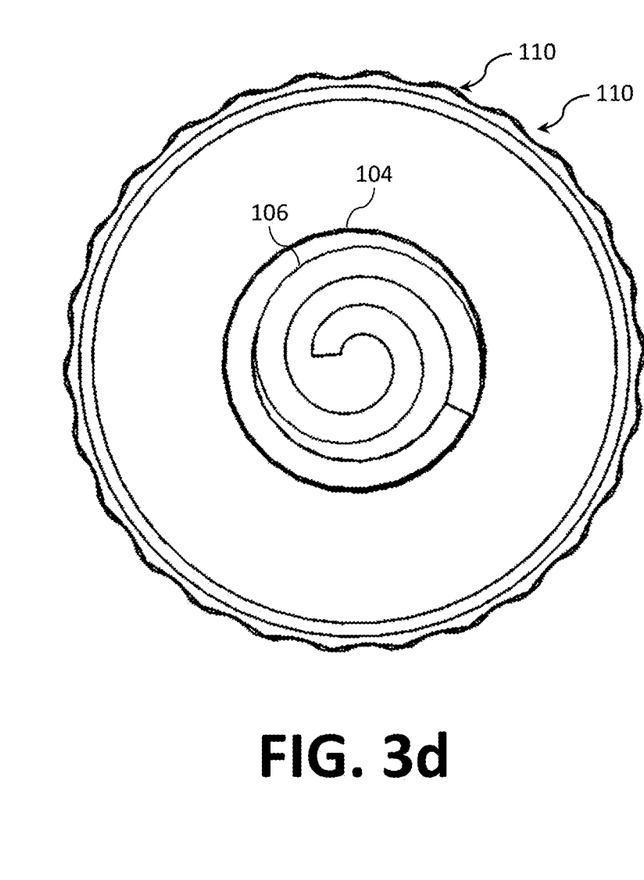
Figure 3E:
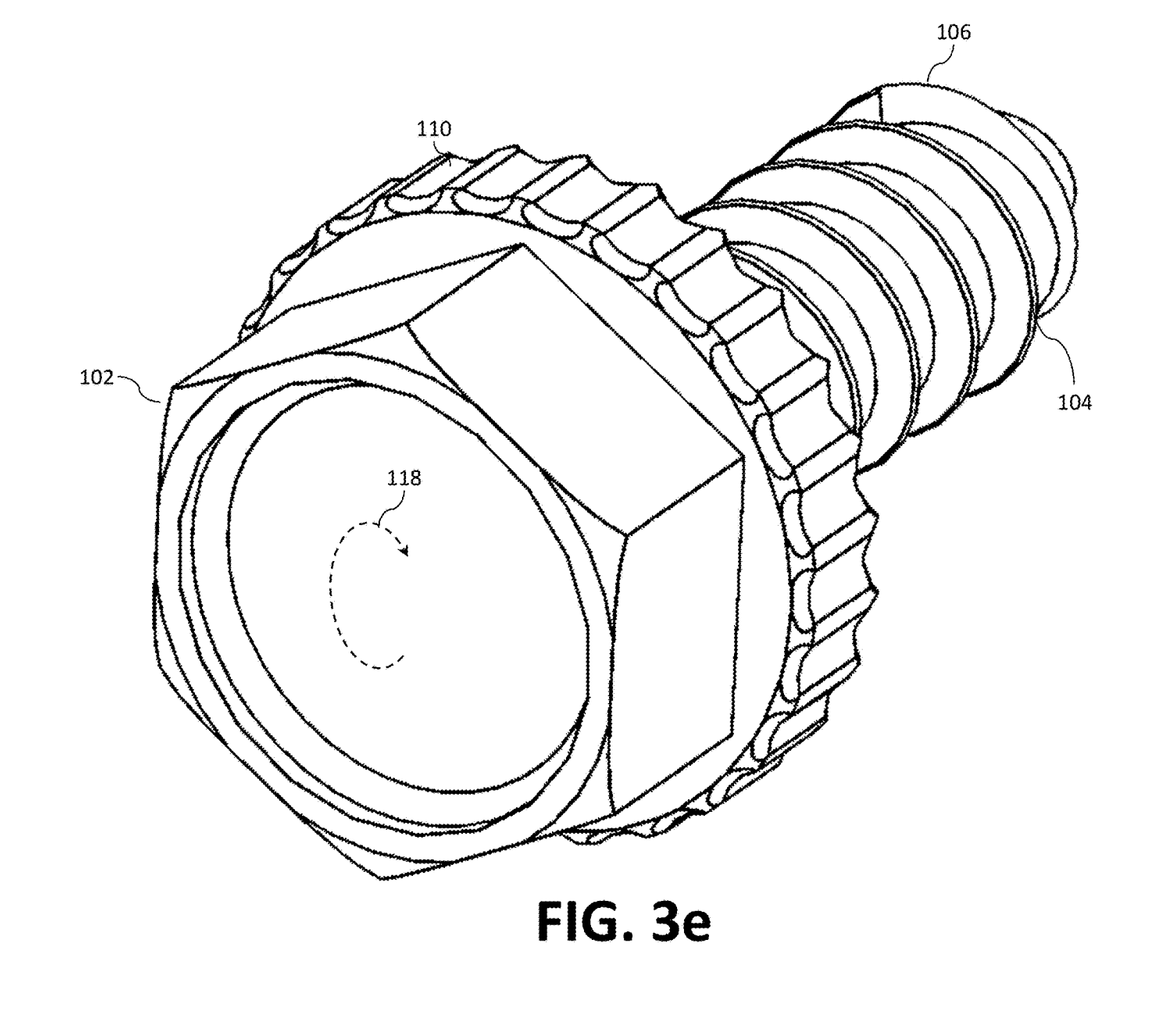

FIG. 3a is a front perspective view of an example sheet-metal fastener 300 in accordance with another aspect of this disclosure, while FIGS. 3b through 3e illustrate, respectively, side, top, bottom, and rear perspective views of the example sheet-metal fastener 300. The sheet-metal fastener 300 of FIGS. 3a through 3e is substantially the same as the sheet-metal fastener 100 of FIGS. 1a through 1e, except the sheet-metal fastener 300 omits the circular flange portion 114 and employs knurls 110 having a different profile. For example, the knurls 110 of the sheet-metal fastener 300 have a rear wall 124 that is generally vertical (i.e., parallel to the axis of rotation 116), whereas the knurls 110 of the sheet-metal fastener 100 have a rear wall 124 that is angled relative to the axis of rotation 116.

An advantage of the sheet-metal fastener 300 over the sheet-metal fastener 100 is the sheet-metal fastener 300 requires less material and is easier to manufacture; however, the sheet-metal fastener 100 provides a more attractive visual appearance when the joist is completed. Therefore, a user may choose between the sheet-metal fastener 100 and the sheet-metal fastener 300 based on the location of the joint 200 and application type.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A sheet-metal fastener configured to join two components, the sheet-metal fastener comprising:
    a head defining an undercut region,
    wherein the head comprises a serrated region at an outer perimeter of the head, the serrated region comprising a plurality of knurls; and
    a shank extending from the undercut region and defining an axis of rotation, wherein the shank comprises one or more threads,
    wherein each of the plurality of knurls is oriented outwardly from the axis of rotation.

2. The sheet-metal fastener of claim 1, wherein the head comprises a flange portion, the serrated region being formed on an underside of the flange portion.

3. The sheet-metal fastener of claim 2, wherein each of the plurality of knurls defines a back wall that is angled with an underside surface of the flange portion at an angle that is greater than 90 degrees.

4. The sheet-metal fastener of claim 3, wherein the angle is 100 degrees.

5. The sheet-metal fastener of claim 2, wherein each of the plurality of knurls defines a back wall that is angled with an underside surface of the flange portion at an angle that is 90 degrees.

6. The sheet-metal fastener of claim 1, wherein the shank includes a notched tip.

7. The sheet-metal fastener of claim 1, wherein the sheet-metal fastener is a self-tapping fastener.

8. The sheet-metal fastener of claim 1, wherein the shank includes threads of different dimensions positioned along a length of the shank.

9. The sheet-metal fastener of claim 1, wherein the head comprises one or engagement features to enable an operator to drive the sheet-metal fastener.

10. The sheet-metal fastener of claim 9, wherein the head is a hex washer head.

11. The sheet-metal fastener of claim 1, wherein each of the plurality of knurls comprises a curvature (C) that is about 0.025 Rad.

12. The sheet-metal fastener of claim 1, wherein the plurality of knurls are formed via a cold-forming process.

13. The sheet-metal fastener of claim 1, wherein, when driven about the axis of rotation, each of the plurality of knurls are configured to pull material from a first one of the components beyond an opening formed in a second one of the component and into the undercut region.

14. A sheet-metal fastener configured to a first sheet metal panel to a second sheet metal panel, the sheet-metal fastener comprising:
    a head defining an undercut region, a flange portion, and a plurality of knurls that form a serrated region,
    wherein the plurality of knurls is distributed along an outer perimeter of the head adjacent an underside surface of the flange portion; and
    a shank extending from the undercut region and defining an axis of rotation, wherein the shank comprises one or more threads,
    wherein the sheet-metal fastener is a self-tapping fastener, and the shank includes a notched tip.

15. The sheet-metal fastener of claim 14, wherein each of the plurality of knurls comprises a curvature (C) that is about 0.025 Rad.

16. The sheet-metal fastener of claim 14, wherein the head comprises a flange portion, the serrated region being formed on an underside of the flange portion, and wherein each of the plurality of knurls defines a back wall that is angled with the underside surface of the flange portion at an angle that is greater than 90 degrees.

17. The sheet-metal fastener of claim 14, wherein each of the plurality of knurls defines a back wall that is angled with an underside surface of the flange portion at an angle that is 90 degrees.

18. A sheet-metal fastener configured to join two components, the sheet-metal fastener comprising:
- a head defining an undercut region,
    - wherein the head comprises a serrated region at an outer perimeter of the head, the serrated region comprising a plurality of knurls; and
- a shank extending from the undercut region and defining an axis of rotation, wherein the shank comprises one or more threads,
    - wherein, when driven about the axis of rotation, the plurality of knurls is configured to pull material from a first one of the components beyond an opening formed in a second one of the components and into the undercut region.

19. The sheet-metal fastener of claim 18, wherein each of the plurality of knurls defines a back wall that is angled with an underside surface of the flange portion at an angle that is greater than 90 degrees.

20. The sheet-metal fastener of claim 18, wherein each of the plurality of knurls is oriented outwardly from the axis of rotation.

* * * * *